US007428487B2

(12) United States Patent (10) Patent No.: US 7,428,487 B2
Wang et al. (45) Date of Patent: Sep. 23, 2008

(54) SEMI-AUTOMATIC CONSTRUCTION METHOD FOR KNOWLEDGE BASE OF ENCYCLOPEDIA QUESTION ANSWERING SYSTEM

(75) Inventors: Ji Hyun Wang, Taejon (KR); Eui Sok Chung, Taejon (KR); Myung Gil Jang, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 792 days.

(21) Appl. No.: 10/828,281

(22) Filed: Apr. 21, 2004

(65) Prior Publication Data

US 2005/0086222 A1 Apr. 21, 2005

(30) Foreign Application Priority Data

Oct. 16, 2003 (KR) .................. 10-2003-0072244

(51) Int. Cl.
*G06F 17/21* (2006.01)
*G06F 17/28* (2006.01)
(52) U.S. Cl. .................. 704/10; 704/7; 704/5
(58) Field of Classification Search .......... 704/5
See application file for complete search history.

(56) References Cited

U.S. PATENT DOCUMENTS 5,519,608 A * 5/1996 Kupiec ............... 704/9
6,092,034 A * 7/2000 McCarley et al. ......... 704/2
6,263,335 B1 * 7/2001 Paik et al. ............. 707/5
2001/0042083 A1 * 11/2001 Saito et al. ............ 707/517
2005/0108344 A1 * 5/2005 Tafoya et al. ........... 709/206
2006/0026203 A1 * 2/2006 Tan et al. .............. 707/104.1

FOREIGN PATENT DOCUMENTS

KR 2002-30545 4/2002

OTHER PUBLICATIONS

Hyo-Shik Shin, et al.; "A Method for Automatic Extraction of Term Definition From Text"; Dept. of Computer Science; Korterm / Kaist; pp. 292-299, Aug. 27, 2003.

* cited by examiner

*Primary Examiner*—David R. Hudspeth
*Assistant Examiner*—Josiah Hernandez
(74) *Attorney, Agent, or Firm*—Lowe Hauptman Ham & Berner LLP (57) ABSTRACT

In a semi-automatic construction method for knowledge base of an encyclopedia question answering system, concept-oriented systematic templates are designed and important fact information related to entries is automatically extracted from summary information and body of the encyclopedia to semi-automatically construct the knowledge base of the encyclopedia question answering system. The method includes the steps of: (a) designing structure of the knowledge base with a plurality of templates for each entry and a plurality attributes related to each of the templates; (b) extracting structured information including the entry, an attribute name and attribute values from summary information of the encyclopedia; (c) extracting unstructured information including an attribute name and attribute values of the entry from a body of the encyclopedia; and (d) storing the structured information and the unstructured information in corresponding template and attribute of the knowledge base according to the entry.

17 Claims, 7 Drawing Sheets

```
KENNEDY, JOHN FITZGERALD — 100
SECTION: ASSASSINATION
RELATED: UNITED STATES HISTORY BIOGRAPHIES         101

102 — BIRTH: UNITED STATES (1917)
     CAREER: 35TH PRESIDENT OF THE UNITED STATES (1917-63) — 103
                                                                    104

ON NOV.22,1963, PRESIDENT KENNEDY WAS SHOT AND KILLED WHILE RIDING IN A MOTORCADE IN
DALLAS, TEX, THE WARREN COMMISSION, APPOINTED BY HIS SUCCESSOR LYNDON JOHNSON TO
INVESTIGATE THE MURDER, EVENTUALLY CONCLUDED THAT IT WAS THE WORK OF A SINGLE ASSASSIN,
LEE, HARVEY OSWALD, KENNEDY'S DEATH SHOCKED THE NATION, MANY FELT THAT HE WOULD HAVE GONE
ON TO ACHIEVE GREATNESS AS A PRESIDENT, SUBSEQUENT REVELATIONS, ESPECIALLY CONCERNING HIS
SEXUAL ACTIVITY, HAVE SOMEWHAT DIMMED HIS LUSTER, BUT THE SENSE THAT HIS ADMINISTRATION
WAS A YOUTHFUL, IDEALISTIC "CAMELOT"REMAIS POWERFUL, HE IS BURIED IN ARLINGTON NATIONAL
CEMETERY.
```

FIG. 1

KENNEDY, JOHN FITZGERALD — 100
SECTION: ASSASSINATION
RELATED: UNITED STATES HISTORY BIOGRAPHIES          101

102 — BIRTH: UNITED STATES (1917)
CAREER: 35TH PRESIDENT OF THE UNITED STATES (1917-63) — 103

104

ON NOV.22,1963, PRESIDENT KENNEDY WAS SHOT AND KILLED WHILE RIDING IN A MOTORCADE IN DALLAS, TEX, THE WARREN COMMISSION, APPOINTED BY HIS SUCCESSOR LYNDON JOHNSON TO INVESTIGATE THE MURDER, EVENTUALLY CONCLUDED THAT IT WAS THE WORK OF A SINGLE ASSASSIN, LEE, HARVEY OSWALD,. KENNEDY'S DEATH SHOCKED THE NATION, MANY FELT THAT HE WOULD HAVE GONE ON TO ACHIEVE GREATNESS AS A PRESIDENT, SUBSEQUENT REVELATIONS, ESPECIALLY CONCERNING HIS SEXUAL ACTIVITY, HAVE SOMEWHAT DIMMED HIS LUSTER, BUT THE SENSE THAT HIS ADMINISTRATION WAS A YOUTHFUL, IDEALISTIC "CAMELOT"REMAIS POWERFUL, HE IS BURIED IN ARLINGTON NATIONAL CEMETERY.

| | TEMPLATE NAME | ATTRIBUTE NAME |
|---|---|---|
| PERSON COMMON ATTRIBUTE | BIRTH | PLACE OF BIRTH |
| | | DATE OF BIRTH |
| | | NATIONALITY |
| | NAME | ANOTHER NAME |
| | DEATH | DATE OF DEATH |
| | ACTIVITY | FIELD OF ACTIVITY |
| | PRIZE WINNING | TITLE OF PRIZE |
| | | DATE OF PRIZE WINNING |
| PERSON INDIVIDUAL ATTRIBUTE | STRUCTURE | BUILDING |
| | | YEAR OF BUILDING |
| | DEVELOPMENT | DEVELOPED PRODUCT |
| | | DATE OF DEVELOPMENT |
| | FIRST APPEARANCE | WORK OF FIRST APPEARANCE |
| | | MAGAZINE OF FIRST APPEARANCE |
| | | DATE OF FIRST APPEARANCE |

FIG. 4

| TEMPLATE NAME | ATTRIBUTE NAME | EXAMPLES |
|---|---|---|
| NAME | ANOTHER NAME | 'YEONGSEO' 'GUNSEOP' 'WOLBONG' 'BILL' 'GATOR' |
| | SUBGROUP | ADULT NAME/PEN NAME/REAL NAME/NICK NAME/ANOTHER NAME |

| TEMPLATE NAME | ATTRIBUTE NAME | ATTRIBUTE TAG |
|---|---|---|
| ACADEMIC BACKGROUND | GRADUATED SCHOOL | GS |
| CAREER | ORGANIZATION | RG |
| CAREER | JOB | RP |
| CAREER | POLITICAL PARTY | LG |
| ELECTION | POSITION | LP |

SEMI-AUTOMATIC CONSTRUCTION METHOD FOR KNOWLEDGE BASE OF ENCYCLOPEDIA QUESTION ANSWERING SYSTEM

BACKGROUND OF THE INVENTION

1. Field of the Invention

The present invention relates to construction of knowledge base of a question answering system, and more particularly, to a semi-automatic construction method for knowledge base of an encyclopedia question answering system. The semi-automatic construction method of the present invention is implemented by designing structure of knowledge base, especially concept-oriented systematic templates, automatically extracting important fact information related to entries from summary information and body of the encyclopedia, and storing the important fact information in the knowledge base. Noticeably, when unstructured information is extracted, intra-sentence dependence relation analysis and maximum entropy model are used in the semi-automatic construction method.

2. Description of the Related Art

An Internet information search system usually uses a searching method based on Boolean matching according to key word. It is widely used in encyclopedia searching services.

However, in a conventional encyclopedia searching service, a user inputs an entry, and then the body contents of the corresponding entry are merely browsed. A question answering service is sometimes provided as a next generation information searching service but the user is not supplied with satisfactory answers to the questions of the user.

It is because the contents of web documents or encyclopedia documents are not only very huge but also composed of various and complex natural language texts so that it is difficult to extract valuable valid information from the documents and index it.

Also, the conventional encyclopedia question answering system does not use an automatic method but, in general, uses questions and answers collected manually through human works so as to construct the knowledge base to provide answers to natural language questions of the user. So, it takes a lot of efforts and costs to construct the knowledge base. The structure of the knowledge base is not only monotonous and unsystematic but also poor in flexibility and availability since the answers to the questions are predicted in advance and stored.

Meanwhile, in relation to semi-automatic construction of knowledge base, information extraction has been being researched in many countries. Autoslog, Whisk and Crystal apply patterns to a limited document to work better. It is not proper to apply such a method to an encyclopedia including various natural language sentences, so that many patterns have to be constructed in the knowledge base one by one.

SUMMARY OF THE INVENTION

Accordingly, the present invention is directed to a semi-automatic construction method for knowledge base of an encyclopedia question answering system, which substantially obviates one or more problems due to limitations and disadvantages of the related art.

It is an object of the present invention to provide a semi-automatic construction method for knowledge base of an encyclopedia question answering system, which includes constructing the structure of the knowledge base more systematically, automatically extracting important fact information related to entries from the summary information and the body of the encyclopedia, and storing the important fact information in the knowledge base, thereby saving time and cost to construct the knowledge base, enhancing efficiency and performance of the question answering system and improving completion of the knowledge base.

It is another object of the present invention to provide a semi-automatic construction method for knowledge base of an encyclopedia question answering system, in which the simple context is not used as learning feature but the intra-sentence dependence relation is analyzed to extract the learning feature in order to use a stochastic model when extracting unstructured information from the body of the encyclopedia in contrast to the conventional method so that it can be very robustly adapted to natural language sentences of various expressions.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a semi-automatic construction method for knowledge base of an encyclopedia question answering system, comprises the steps of: (a) designing structure of the knowledge base with a plurality of templates for each entry and a plurality of attributes related to each of the templates; (b) extracting structured information including the entry, an attribute name and attribute values from summary information of the encyclopedia; (c) extracting unstructured information including an attribute name and attribute values of the entry from a body of the encyclopedia; and (d) storing the structured information and the unstructured information in corresponding template and attribute of the knowledge base according to the entry.

In the step (a), the structure of the knowledge base is preferably constructed with common attribute templates for a common attribute shared in categories of the encyclopedia and individual attribute templates for a specific attribute of an individual category of the encyclopedia, for each entry.

In the step (a), it is desirable that the attributes having similar meaning are managed as a representative attribute integrally and detail meanings of the attributes are grouped and defined in separate subgroup fields.

The step (c) preferably comprises the steps of: (c-1) converting each sentence of illustrative corpus into a token string, recognizing dependence relation of an attribute tagging token, generating learning data, and learning the learning data through a predetermined stochastic model; and (c-2) converting each sentence of the body of the encyclopedia into the token string, recognizing dependence relation of an extraction object tokens, and applying a learning result and the stochastic model to a recognition result, thereby finding and extracting the attribute name and the attribute value of each extraction object token.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

To achieve the object to semi-automatically construct the knowledge base of the encyclopedia question answering system, the present invention has the following characteristics.

First, to design the structure of the knowledge base for storing the information extracted from the encyclopedia, the structure of the knowledge base is constructed with the templates which include a common attribute shared in categories of the encyclopedia, and the templates which include a specific attribute of an individual category of the encyclopedia.

Second, considering that the summary information of the encyclopedia is generally described in a patterned format, attribute names and attribute values are automatically extracted from the summary information of the encyclopedia in a structured information extraction method.

Third, the attribute names and the attribute values are extracted from the body of the encyclopedia in an unstructured information extraction method at a learning and extraction step. In other words, a learning process is performed on an encyclopedia attribute tagging corpus by using dependence rule so as to construct a stochastic model which has a context consisting of a dependent and a governor that are closest to a current token. The attribute values are automatically extracted from the body of the encyclopedia by using the stochastic model made as described above. Especially, a maximum entropy model is used as the stochastic model.

Reference will now be made in detail to the preferred embodiments of the present invention, examples of which are illustrated in the accompanying drawings.

Generally, an entry of the encyclopedia includes summary information and a body. The summary information has a patterned format including an attribute name and an attribute value. The body of the encyclopedia consists of unpatterned natural language sentences.

Figure 1:
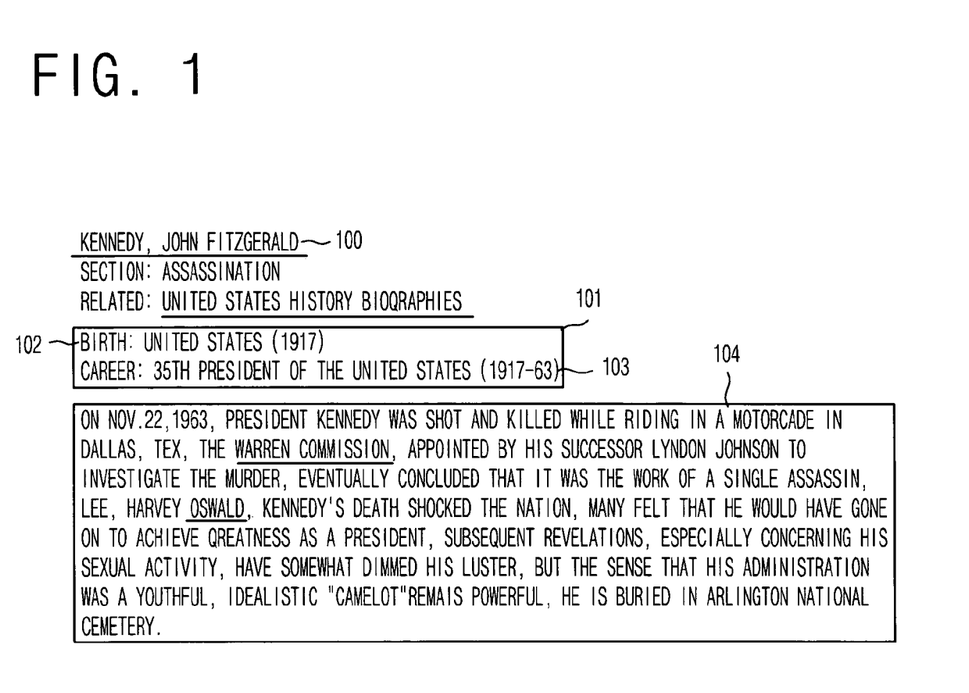
FIG. 1 illustrates an example of encyclopedia that is an object from which information is extracted in the present invention.

FIG. 1 illustrates an example of encyclopedia that is a main object from which information is extracted in the present invention.

As shown in FIG. 1, the encyclopedia includes an entry 100, summary information 101 and a body 104. The summary information 101 includes an attribute name 102 and an attribute value 103. The body 104 consists of free format natural language sentences in contrast to the summary information.

Figure 2:
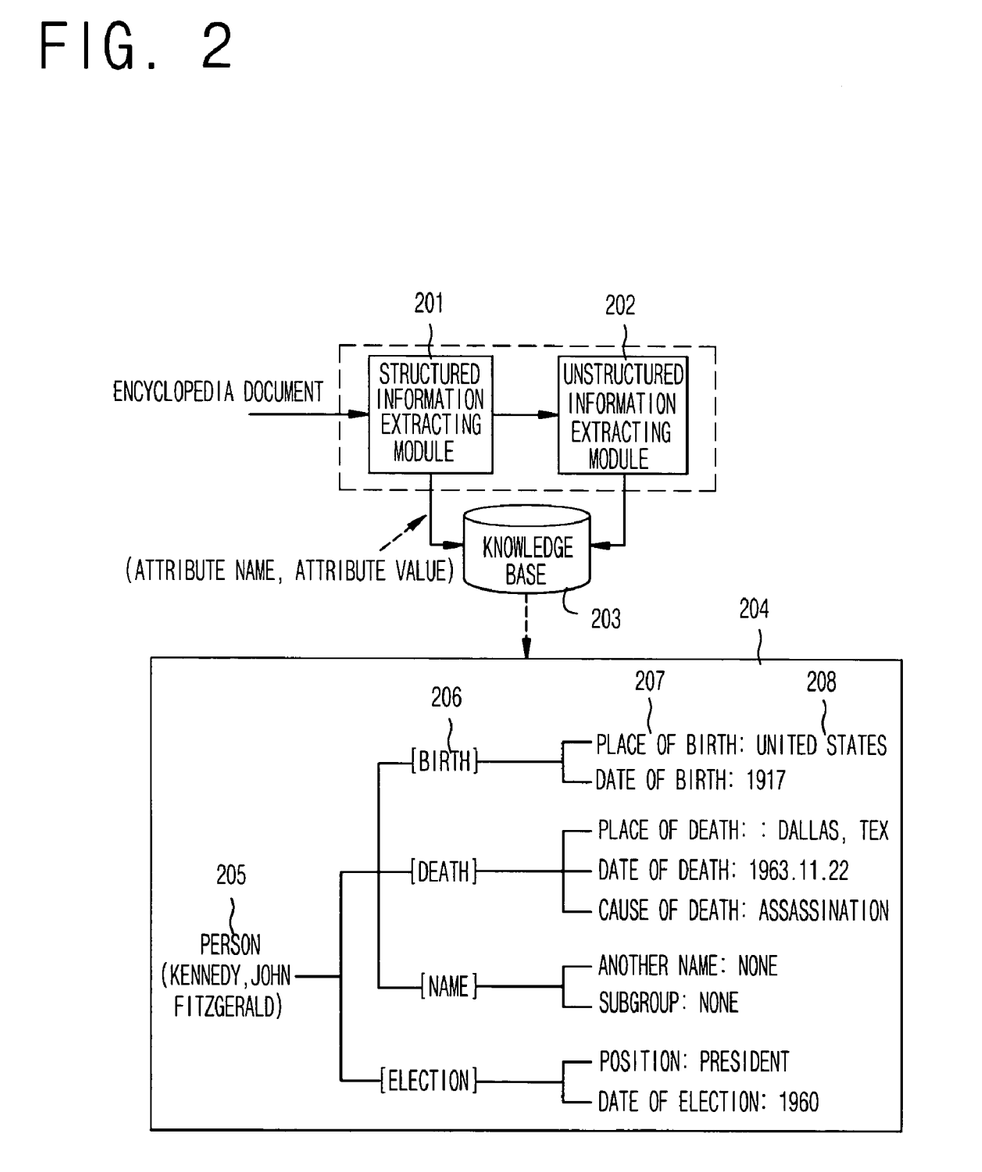
FIG. 2 illustrates a concept of an encyclopedia knowledge base construction system according to the present invention.

FIG. 2 illustrates a schematic concept of an encyclopedia knowledge base construction system according to the present invention.

As shown in FIG. 2, when an original text of the encyclopedia is inputted, a structured information extracting module 201 extracts an entry, an attribute name and an attribute value from the summary information of the encyclopedia and stores them in the knowledge base 203.

As described above, if all the summary information is extracted from the input encyclopedia text, an unstructured information extracting module 202 automatically recognizes the attribute value that is an extraction object in the body of the encyclopedia, and stores the attribute value in the knowledge base. Here, the unstructured information extracting module 202 also recognizes and stores the attributes that are omitted from the summary information.

Also, the detail structure 204 of the knowledge base is illustrated at the lower part in FIG. 2. In other words, the knowledge base 203 consists of entries 205 and a plurality of templates 206. Each template 206 consists of a plurality of attributes 207. The attribute values extracted from the summary information 101 and the body 104 are stored according to the corresponding attribute of the corresponding template.

Figure 3:
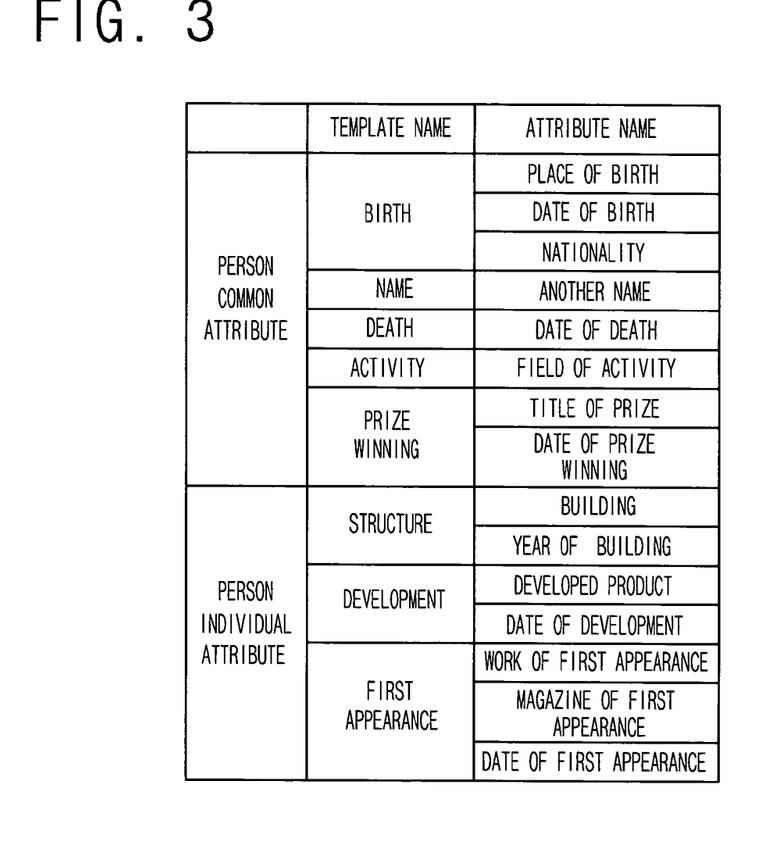
FIG. 3 illustrates an example of a knowledge base template according to the present invention.

On the other hand, an embodiment of the template 206 is suggested in FIG. 3.

FIG. 3 illustrates an example of the template corresponding to "person" in the encyclopedia category hierarchy according to the present invention. The template consists of person common attributes that are included commonly in all the entries corresponding to "person" category, and person individual attributes that are specific in the individual category.

For example, the frequently appearing concepts such as "place of birth", "date of birth", "nationality" and "ancestral home family origin" are defined as attributes. The template "birth" consists of the attributes. Besides, the main person common concepts such as "name", "death", "activity", "prize winning", etc are defined as template types. Each template consists of a plurality of related attributes. The knowledge of the encyclopedia can be systematically managed according to concepts. Similarly, besides the person common attributes, characteristic concepts ("structure", "development", "first appearance", etc.) are defined in the form of template according to an individual category. Each template includes a plurality of attributes of similar meaning.

When defining such a template, if the concept of the attribute is defined too detail, one template includes too many attributes, so that the answer searching time of the question answering system can be increased. The improper attributes can be defined for some entries, so that the space can be wasted.

To overcome this problem, the subdivided attributes are integrated and stored as a representative attribute. The detailed meanings of the subdivided attributes are stored in subgroup fields.

Figure 4:
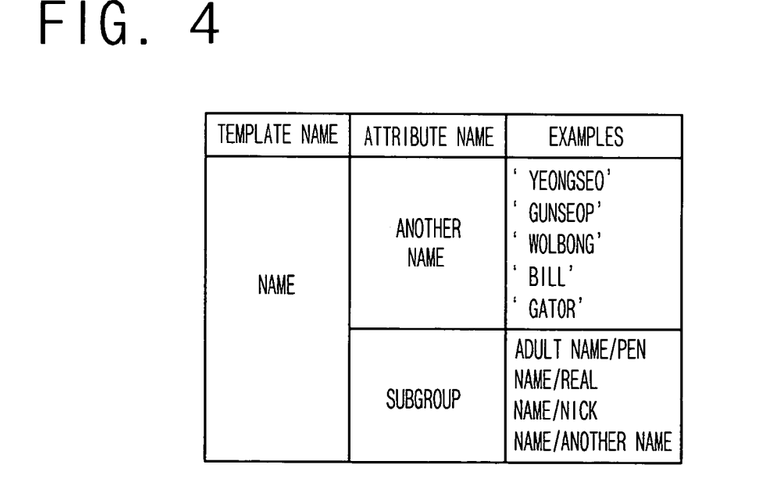
FIG. 4 illustrates an example of a template subgroup according to the present invention.

FIG. 4 illustrates an example that the template "name" includes subgroups. "Real name", "adult name", "pen name", "nick name", etc. of each person entry are all stored as a representative attribute "another name". Each attribute value is distinguished to be "adult name", "pen name", "nick name", etc. referring to the subgroup fields. The subdivided meanings are not discarded but stored so that the answer searching time of the question answering system of the present invention is saved and also the original meaning of the attribute value is not lost.

Meanwhile, a structured information extraction method of extracting summary information and an unstructured information extraction method of extracting information from the body are suggested as the method to extract the information from the encyclopedia.

Figure 5:
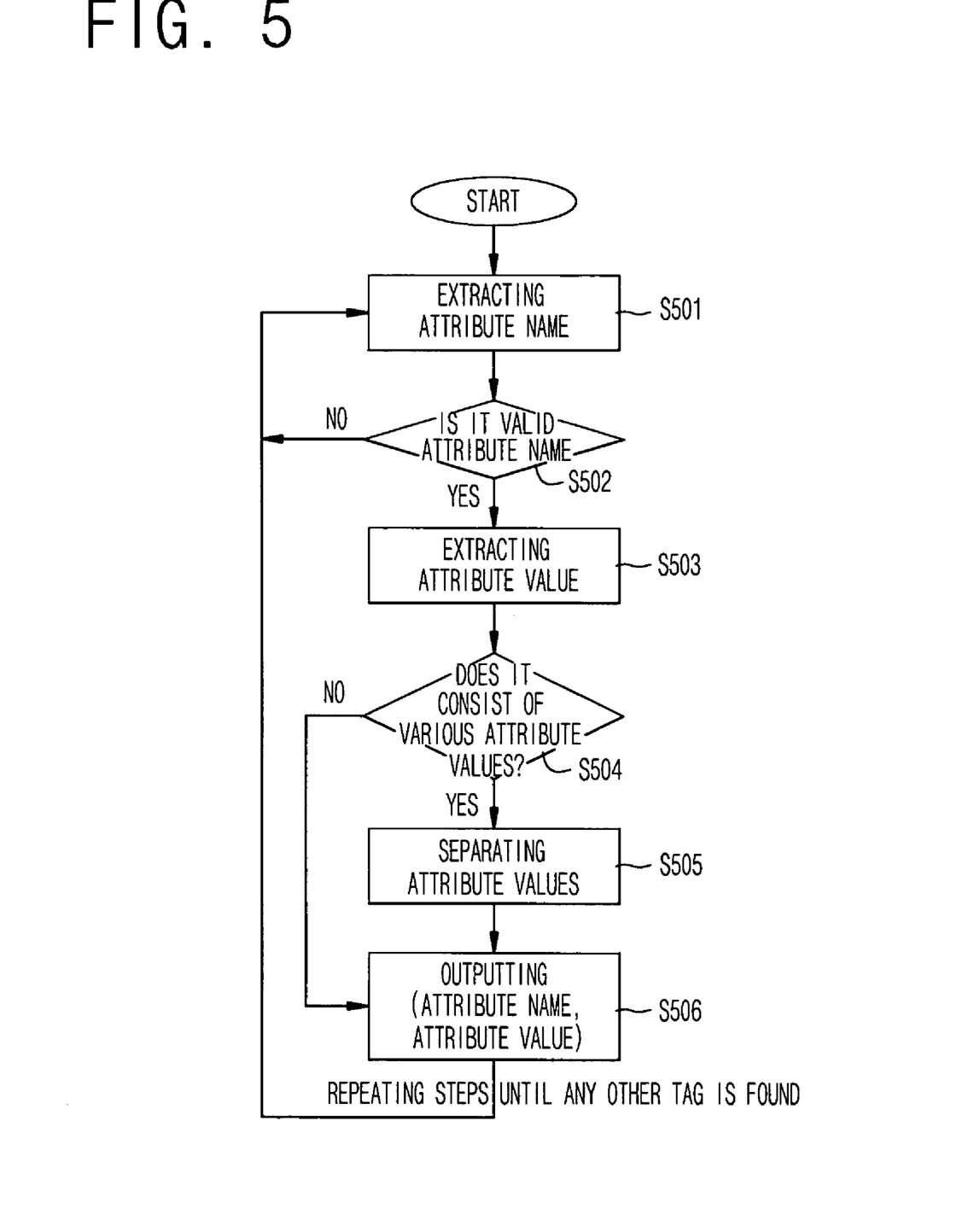
FIG. 5 illustrates a structured information extraction process according to the present invention.

FIG. 5 illustrates a structured information extraction process according to the present invention.

Since the summary information of the encyclopedia generally has patterned format, the locations of the attribute names and the attribute values are fixed. For example, supposing that the summary information has the format of "attribute name: attribute value", the string before the identifier colon ":" is extracted as an attribute name (S501).

Also, it is ascertained whether the extracted attribute name is a valid attribute name in an attribute list of the template of the knowledge base. If the extracted attribute name is not the valid attribute name in the attribute list of the template of the knowledge base, the process of extracting next attribute name is repeated (S502).

If the extracted attribute name is the valid attribute name in the attribute list of the template of the knowledge base, the sting after colon ":" is extracted as an attribute value (S503). Here, more than one attribute values may appear as extracted attribute values. For example, in case of a plurality of attribute values such as "Korea juveniles film festival cinematography prize, Baeksang art first prize scenario prize in 1983, Daejong prize film festival new director prize in 1994", attribute values are separated and extracted with reference to a plurality identifiers (symbols such as ",", ".", ":", ";", etc.) (S505 and S506).

On the other hand, since the body of the encyclopedia consists of unpatterned natural texts in contrast to the summary information, natural language analysis method or machine learning method is required.

The method of the present invention is made by mixing a dependence rule used in language analysis with a stochastic machine learning method so that the method of the present invention works well at the various and complex natural language texts.

In the present invention, learning data is extracted from a learning corpus by using the dependence rule based on dependency grammar, and fact information is extracted through stochastic machine learning.

The dependence rule to extract the learning data in the present invention identifies only the dependence relation between word-phrases.

When a word-phrase X depends on the other word-phrase Y and the two word-phrases X and Y are in dependence relation, X is call a "dependent" and Y is a "governor".

The rule to identify dependence relation will be described as follows.

First, the rule is dependence relation based on a case. If the dependent is subjective case, objective case or adverbial case, the governor is the verb phrase nearest to the dependent. If the dependent is pre-noun case or conjunctive case, the governor is the noun nearest to the dependent.

Second, as for neighboring nouns or object names between, a preceding noun or object name is a dependent and a following noun or object name is a governor.

Third, in contrast to the other document, the body of the encyclopedia includes a lot of symbols. For example, "there is as a book, <<Studies in Ethnomethodology>> (1967)", the brackets "<<" and ">>" embracing the name of book, and the bracket "(" and ")" embracing the year can be often found. The governor whose next token is a symbol is a verb phrase.

Considering that a dependence rule is applied on the basis of dependence rules as described above, the dependent on the left and the governor on the right that are nearest to the current token are found, and learning data that has context consisting of the nearest dependent and the nearest governor can be extracted.

To extract a learning feature, the conventional method of extracting context of the current token as learning feature is not proper to the encyclopedia including natural sentences of various expressions.

Also, in the present invention, the learning data extracted in the above-mentioned method is learnt using a maximum entropy model. The maximum entropy model can accommodate any kind of features. If a feature to be used rather than a method of learning a feature is selected, the parameter is automatically determined by the internal algorithm in the maximum entropy model, so that the same learning engine can be reused for various problems. In contrast to other stochastic models, though many features are added, the stability of the model is ensured.

$$E[f_j] = \tilde{E}[f_j], 1 \leq j \leq k \quad \text{Equation 1}$$

$$E[f_j] = \sum_{x,y} p(x,y) f_j(x,y)$$

$$\tilde{E}[f_j] = \sum_{i=1}^{n} \tilde{p}(x_i, y_i) f_j(x_i, y_j)$$

Equation 1 is a constraint equation of the maximum entropy model. Here, f is a feature function and means dependence rule in the present invention. Context data satisfying f among all the contexts observed from a corpus are represented as probability distributions of $E[f_j]$. x is a set of all the contexts extracted by dependence rule and y is all the attribute types. n means the total number obtained by multiplication of x and y found in the learning data of a corpus. In the stochastic model based on the maximum entropy principle, the probability distribution having maximum entropy is found among the probability distributions satisfying the constraint equation.

$$p = \{p \mid E[f_j] = \tilde{E}[f_j], j = \{1 \ldots k\}\} \quad \text{Equation 2}$$

$$p^* = \arg\max_{p \in P} H(p)$$

$$H(p) = -\sum_{x,y} p(x,y) \log p(x,y)$$

$$= -\sum_{x,y} \tilde{p}(x) p(y \mid x) \log p(y \mid x)$$

$$p(y \mid x) = \frac{1}{Z(x)} \exp\left[\sum_{i=i}^{k} \lambda_i f_i(x,y)\right]$$

$$Z(x) = \sum_{y} \exp\left[\sum_{i=i}^{k} \lambda_i f_i(x,y)\right]$$

In equation 2, P* is the probability distribution having maximum entropy of the probability distribution satisfying P. H(p) is calculation equation of entropy. λ in the equation of p(y|x) in the equation H(p) is a weight of various feature functions, and λ is a parameter that is automatically determined by an internal algorithm in a learning step. The process to determine this parameter λ is the main learning contents to find the probability distribution that has the maximum entropy. The last $Z(x)$ is the equation to normalize the calculated value.

Figure 6:
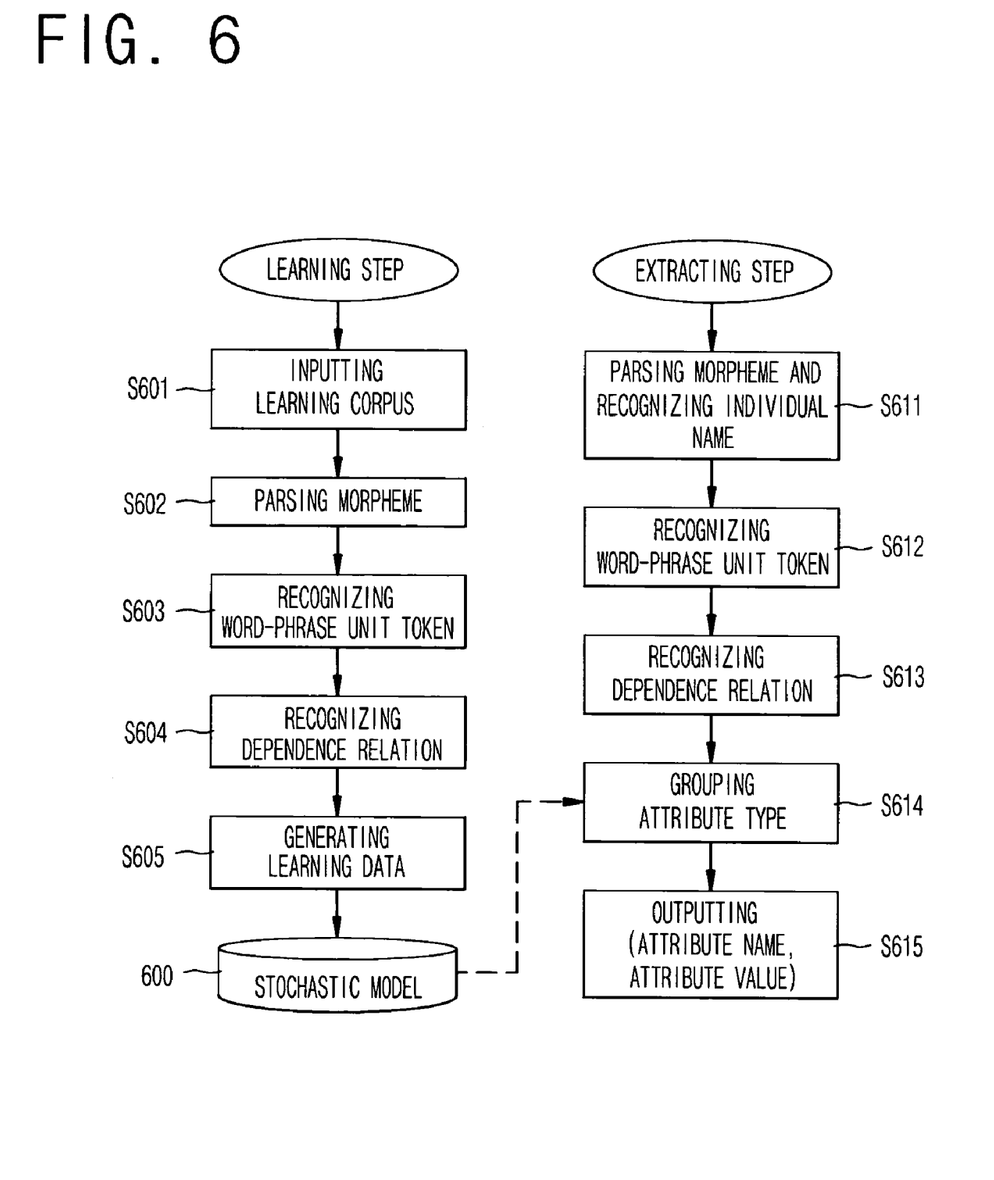
FIG. 6 illustrates an unstructured information extraction process according to the present invention.
Figure 7A:
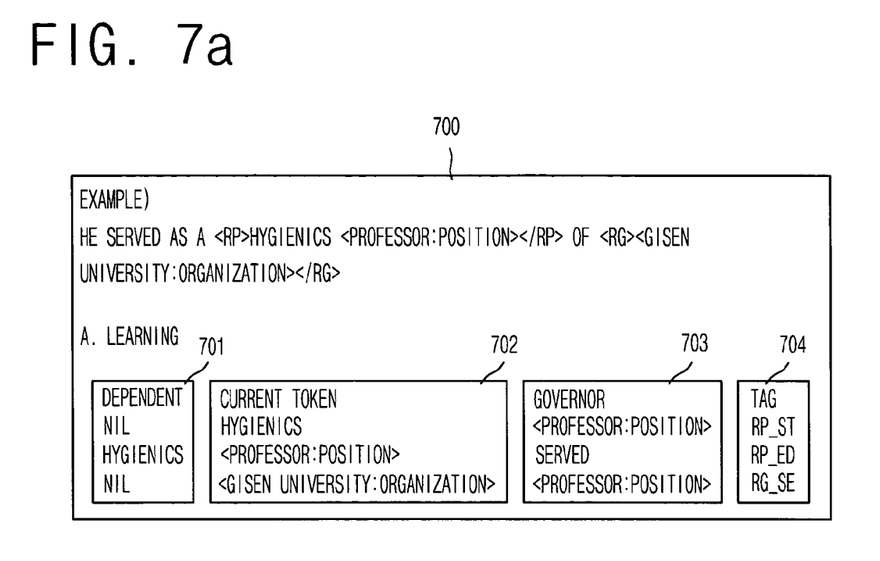
FIGS. 7A and 7B illustrate examples of unstructured information extraction according to the present invention.
Figure 7B:
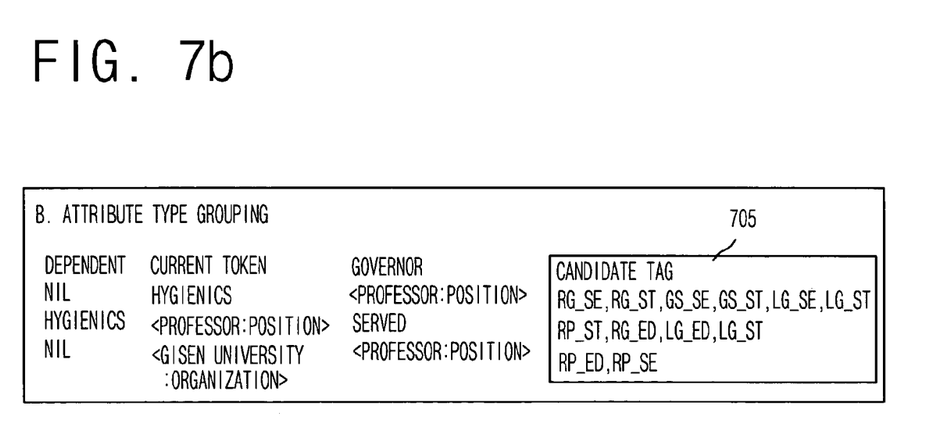
Figure 8:
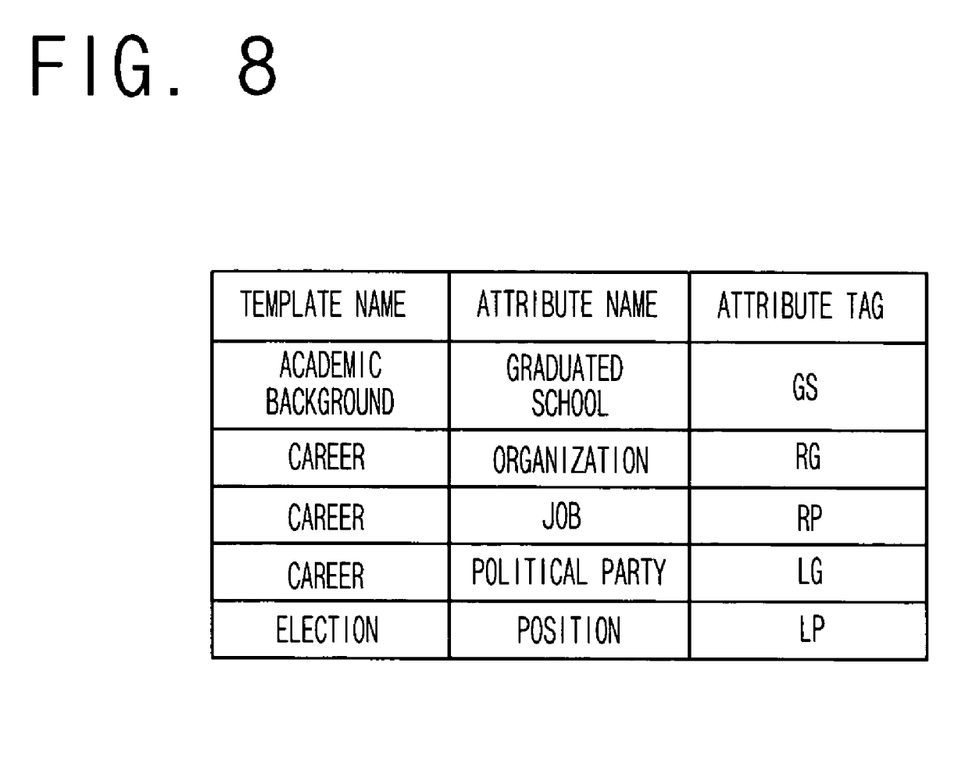
FIG. 8 is a table showing meanings of attribute tags according to the present invention.

Referring to FIGS. 6 through 8, a process to extract the unstructured information from the body of the encyclopedia will be described.

FIG. 6 illustrates a learning step and an extraction step of an unstructured information extraction process according to the present invention. To extract information from a document, the learning step is first performed and then the extraction step should be performed next.

In the learning step, an encyclopedia learning text corpus tagged with an object name and an attribute is received and morpheme is parsed (S601 and S602). The word-phrase unit token string is recognized based on the morpheme parsing result according to each sentence (S603). The dependence relation between a governor and a dependent is recognized by applying the dependence rule described above to the tokens tagged with the attribute value in a sentence (S604). The learning data having the governor and the dependent as context is generated, and then is stored in a stochastic model database 600 along with the learning result of the maximum entropy model (S605).

The stochastic model is preferably the maximum entropy model but is not limited to the maximum entropy model. The skilled in the art can use other available models such as a maximum entropy boosting model, a back-off model, a determination tree model, etc.

FIG. 7A illustrates an example 800 of a learning process.

For example, description will be made using a sentence of the corpus tagged with the object name and the attribute such as "He served as a <RP> hygienics <professor:POSITION></RP> of <RG><Gisen university:ORGANIZATION></RG>.".

"<RG>" in the given sentence tagged with the attribute is location at which the attribute value of an organization name representing career begins. "</RG>" is location at which the attribute value ends. "<RP>" is position of the career. In "<Gisen university:ORGANIZATION>", "Gisen university" is the object name of ORGANIZATION. In "<professor:POSITION>", "professor" is the object name of POSITION.

The above-mentioned sentence is recognized as word-phase unit token string, and the learning data of the left dependent 701 and the right governor 703 of the current token 702 is generated as illustrated at 701, 702 and 703.

Also, Tag 804 is an attribute tag of the current token. Each attribute tags are shown in FIG. 8. Tag 704 in FIG. 7 is an attribute tag shown in FIG. 8 attached with "_SE" (single), "_ST" or "_ED" as a suffix. In other words, Tag 804 in FIG. 8 represents the location of each current token in the corresponding attribute value for a case that an attribute value consists of a plurality of tokens.

As described above, if the learning step to extract the unstructured information is completed, the extraction step to extract information from the body of the encyclopedia is performed.

Referring to FIG. 6, in the information extraction step, a morpheme parsing and object name recognition process is performed (S611).

On the basis of such a morpheme parsing and object name recognition process, each sentence is converted into word-phrase unit token string (S612). The token, that corresponds to an object name or whose real morpheme corresponds to a noun, is searched from the token string and designated as the current token. The reason why the current token is limited as described above is that most tokens corresponding to the attribute tagging objects are object names or general terms.

The dependence rule is applied to the designated current token to find context tokens corresponding the dependent and the governor (S613).

These tokens are inputted to the maximum entropy model learnt at the learning step, and the attribute types of the current token are grouped (S614). The attribute type having maximum probability is extracted as the attribute name and the attribute value of the current token (S615).

FIG. 7B illustrates examples of unstructured information extraction from the exemplary sentence "He served as a hygienics professor of Gisen university.".

The sentence is tagged through a morpheme parsing and object name recognition process as "He served as a hygienics <professor:POSITION> of <Gisen university:ORGANIZATION>", and then is converted into word-phrase unit token string. The object name "<Gisen university:ORGANIZATION>" and "<professor:POSITION>" and the noun "hygienics" are designated as the current token. Each of dependents and governors is found from the token string to group the current token attribute types by the maximum entropy model. Index window 705 is a list of attribute types of the current tokens in the order of entropy. The leftmost tag of the candidate attributes is the final result. In other words, attribute values of "<Gisen university:ORGANIZATION>", "hygienics" and "<professor:POSITION>" are estimated as "RG_SE", "RP_ST" and "RP_ED" respectively and extracted as the attribute values "(career.organization, Gisen university)" and "(career.position, hygienics professor)".

Meanwhile, as described above, if the unstructured information extraction process is performed, generally a plurality of "(attribute name, attribute value)" can be obtained. Of the plurality of "(attribute name, attribute value)", there can be attribute values extracted from summary information at the structured information extraction step.

Accordingly, before the attribute values extracted from the unstructured information are stored, it is checked whether the corresponding attribute value exists in the knowledge base by using the attribute name. If the attribute name exists in the knowledge base, the attribute value extracted by an unstructured information extraction method is discarded. If the attribute name does not exist in the knowledge base, the attribute value is not in the summary information. Then, the attribute value is additionally filled to construct knowledge base.

In the semi-automatic construction method for knowledge base of the encyclopedia question answering system, the knowledge base is semi-automatically constructed on the basis of systematic template so that more valuable and flexible knowledge format can be constructed and the encyclopedia question answering system rapidly and easily provides the answer. The cost and effort can be saved to construct the knowledge base.

According to the present invention, the useful information omitted from the summary information of the encyclopedia is automatically recognized through the body of the encyclopedia, and then is extracted, reformed and constructed in the form of summary information to enhance of completion of the knowledge base.

According to the present invention, in the unstructured information extraction method, intra-sentence dependence relation is analyzed to learn in contrast to the unstructured information extraction method of simply learning context, so that it can be very robustly adapted to natural language sentences of various expressions.

According to the present invention, the maximum entropy model is applied to extract unstructured information, in which a lot of learning features should be learned.

The above description is merely an embodiment to implement the semi-automatic construction method for knowledge base of the encyclopedia question answering system. It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A semi-automatic construction method for a knowledge base of an encyclopedia question answering system, the method comprising the steps of:
    (a) constructing a structure of the knowledge base with a plurality of templates for each entry of an encyclopedia and a plurality attributes related to each of the templates, wherein each entry of said encyclopedia includes (i) a body and (ii) summary information of said body;
    (b) automatically extracting structured information, including at least an attribute name and associated attribute values, from the summary information of the entry in the encyclopedia;
    (c) automatically extracting unstructured information, including at least an attribute name and associated attribute values, from the body of the entry in the encyclopedia; and
    (d) storing the automatically extracted structured information and unstructured information in the corresponding templates and attributes of the knowledge base according to the entry;
    wherein the unstructured information automatically extracted in the step (c) from the body of the entry is the information omitted from the summary information of said entry, and is subsequently reformed and constructed in the form of the summary information for storing in the step (d), thereby enhancing completion of the knowledge base.

2. The method of claim 1, wherein in the step (a), the structure of the knowledge base is constructed with common attribute templates of a common attribute shared in categories of the encyclopedia and individual attribute templates of a specific attribute of an individual category of the encyclopedia, for each entry.

3. The method of claim 1, wherein in the step (a), attributes having similar meaning are managed as a representative attribute integrally and detailed meanings of the attributes are grouped and defined in separate subgroup fields.

4. The method of claim 1, wherein the step (b) comprises the steps of:
    (b-1) recognizing a patterned format of the summary information of each entry; and
    (b-2) extracting the attribute name and associated attribute values based on the recognized patterned format.

5. The method of claim 4, wherein the step (b-2) comprises the steps of:
    (b-2-i) extracting the attribute name though the recognized patterned format of the summary information of each entry;
    (b-2-ii) ascertaining whether the extracted attribute name belongs to a valid attribute in an attribute list of the templates of the knowledge base; and
    (b-2-iii) extracting the corresponding attribute value from the summary information only if the extracted attribute name belongs to the valid attribute in the attribute list of the templates of the knowledge base.

6. The method of claim 4, wherein the step (b) further comprises the steps of:
    (b-3) if the extracted attribute name has a plurality of attribute values, extracting each of the plurality of attribute values separately by marked identifiers.

7. The method of claim 1, wherein the step (c) comprises the steps of:
    (c-1) converting each sentence of an illustrative corpus into a token string, recognizing dependence relation of an attribute tagging token, generating learning data, and learning the learning data through a predetermined stochastic model; and
    (c-2) converting each sentence of the body of each entry of the encyclopedia into a token string, recognizing dependence relation of an extraction object tokens, and applying a learning result and the stochastic model of step (c-1) to a recognition result, thereby finding and extracting the attribute name and the attribute value of each extraction object token.

8. The method of claim 7, wherein the step (c-1) comprises the steps of:
    (c-1-i) performing morpheme parsing on the illustrative corpus, which is tagged with an object name and an attribute, and recognizing a word-phrase unit token string for each sentence of the illustrative corpus;
    (c-1-ii) applying a predetermined dependence rule to a token tagged with an attribute value in the token string, thereby recognizing dependence relation between a governor and a dependent for the object token; and
    (c-1-iii) generating the learning data by using the governor and the dependent of each object token as context, and storing the learning result in the stochastic model.

9. The method of claim 7, wherein the step (c-2) comprises the steps of:
    (c-2-i) performing the morpheme parsing and object name recognition on the body of each entry of the encyclopedia, and converting each sentence of the body into a word-phrase unit token string;
    (c-2-ii) designating a token of the token string as an extraction object token, the token of the token string having object name or full morpheme as a noun;
    (c-2-iii) applying a predetermined dependence rule to each of the designated extraction object tokens, and recognizing a context token of the governor and the dependent; and
    (c-2-iv) applying the extraction object token and the context token to the learning result and the stochastic model, grouping attribute types of the extraction object tokens, and extracting the attribute type of the extraction object tokens that have highest probabilities with the attribute names and the attribute values of the extraction object tokens.

10. The method of claim 8, wherein, in the dependence rule used to recognize the dependence relation, the governor is a verb phase nearest to the dependent if the dependent is any one selected from the group consisting of a subjective case, an objective case and an adverbial case, and the governor is a noun nearest to the dependent if the dependent is any one selected from the group consisting of an adnorminal phrase and an adnorminal clause.

11. The method of claim 8, wherein in the dependence rule used to recognize the dependence relation, in case of neighboring nouns and/or object names, a preceding noun or a preceding object name is a dependent and a following noun or a following object name is a governor.

12. The method of claim 8, wherein in the dependence rule used to recognize the dependence relation, when tokens around an object name or nouns are symbols, a verb phase of a sentence is a governor.

13. The method of claim 7, wherein a maximum entropy model is used as the stochastic model.

14. The method of claim 1, wherein the step (d) comprises the steps of:
(d-1) constructing the knowledge base with the attribute name and the attribute values extracted in the step (b); and
(d-2) additionally storing the attribute name and the attribute values extracted as the unstructured information in the knowledge base according to existence of the same attribute value of the entry.

15. The method of claim 1, wherein the step (d) comprises storing the attribute name and associated attribute values automatically extracted from the unstructured information of the body of the entry only if the extracted attribute name does not exist in the knowledge base according to said entry.

16. The method of claim 1, further comprising, before the step (d) an after the step (c), the steps of
checking whether the attribute name automatically extracted from the unstructured information of the body of the entry exists in the knowledge base according to said entry or not,
if yes, discarding the attribute name and associated attribute values automatically extracted from the unstructured information of the body of the entry,
otherwise, storing, as structured information, the attribute name and associated attribute values automatically extracted from the unstructured information of the body of the entry in said knowledge base according to said entry.

17. The method of claim 1, wherein the step (b) is performed before the step (c) and the method further comprises, before the step (d) an after the step (c), the steps of
checking whether the attribute name automatically extracted from the unstructured information of the body of the entry has been extracted from the summary information of said entry or not,
if yes, discarding the attribute name and associated attribute values automatically extracted from the unstructured information of the body of the entry,
otherwise, storing, as structured information, the attribute name and associated attribute values automatically extracted from the unstructured information of the body of the entry in said knowledge base according to said entry.

* * * * *